United States Patent [19]
Garner et al.

[11] Patent Number: 5,882,370
[45] Date of Patent: Mar. 16, 1999

[54] METHOD OF BENDING GLASS SHEETS

[75] Inventors: Jeffrey Garner, Wigan; Ian Nicholas Tetlow, Coventry, both of United Kingdom

[73] Assignee: Pilkington Glass Limited, St. Helens, United Kingdom

[21] Appl. No.: 477,271

[22] Filed: Jun. 7, 1995

[51] Int. Cl.⁶ .......................... C03B 23/03; C03B 23/025
[52] U.S. Cl. .............................. 65/106; 65/107
[58] Field of Search ........................... 65/107, 106, 111, 65/268, 273, 275, 287, 290, 291, 305, 306, 362

[56] References Cited

U.S. PATENT DOCUMENTS

| | | |
|---|---|---|
| 2,646,647 | 7/1953 | Bamford et al. ............... 65/273 |
| 2,957,277 | 10/1960 | White et al. ................. 65/273 |
| 3,115,403 | 12/1963 | Julio ......................... 65/291 |
| 3,220,822 | 11/1965 | Jendrisak .................... 65/291 |
| 4,074,996 | 2/1978 | Hagedorn et al. ............. 65/273 |
| 4,265,650 | 5/1981 | Reese et al. . |
| 4,290,796 | 9/1981 | Reese et al. . |
| 4,437,871 | 3/1984 | McMaster et al. ............. 65/106 |
| 4,609,391 | 9/1986 | McMaster . |
| 4,661,141 | 4/1987 | Nitschke et al. . |
| 4,756,735 | 7/1988 | Cathers et al. ............... 65/107 |
| 4,756,785 | 7/1988 | König et al. . |
| 4,778,507 | 10/1988 | Aruga et al. . |
| 4,828,598 | 5/1989 | Imamura et al. . |
| 4,909,820 | 3/1990 | Hirotsu et al. . |
| 5,045,101 | 9/1991 | Hirotsu et al. . |
| 5,059,235 | 10/1991 | D'Iribarne et al. . |
| 5,071,461 | 12/1991 | Hirotsu et al. . |
| 5,092,916 | 3/1992 | McMaster ................... 65/273 |
| 5,108,480 | 4/1992 | Sugiyama . |
| 5,122,180 | 6/1992 | Mathivat et al. . |
| 5,141,550 | 8/1992 | Reunamaki ................... 65/273 |
| 5,167,689 | 12/1992 | Weber . |
| 5,173,102 | 12/1992 | Weber et al. . |
| 5,178,659 | 1/1993 | Watanabe et al. . |
| 5,279,635 | 1/1994 | Flaugher et al. . |
| 5,302,176 | 4/1994 | Shibuya et al. . |
| 5,383,990 | 1/1995 | Tsuji . |
| 5,397,647 | 3/1995 | Kramling et al. ............. 65/106 |

FOREIGN PATENT DOCUMENTS

| | | |
|---|---|---|
| 0300416 | 1/1989 | European Pat. Off. . |
| 0338216 | 10/1989 | European Pat. Off. . |
| 0414232 | 2/1991 | European Pat. Off. . |
| 0415827 | 3/1991 | European Pat. Off. . |
| 0 531 152 | 3/1993 | European Pat. Off. . |
| 0613864 | 9/1994 | European Pat. Off. . |
| 0640569 | 3/1995 | European Pat. Off. . |
| 2011377 | 7/1979 | United Kingdom . |
| 2063851 | 6/1981 | United Kingdom . |
| 2213143 | 8/1989 | United Kingdom . |

*Primary Examiner*—Steven P. Griffin
*Attorney, Agent, or Firm*—Burns, Doane, Swecker & Mathis, L.L.P.

[57] ABSTRACT

A method of bending glass sheets, the method including the steps of gravity bending a glass sheet at elevated temperature on a gravity bending mould in a gravity bending zone of a furnace, press bending the gravity bent glass sheet to a desired shape with an upper mould while the glass sheet is supported by the gravity bending mould as a lower mould in a press bending zone of the furnace and controlling the ambient temperature in the press bending zone thereby to control the cooling rate of the glass sheet in the press bending zone. The invention also provides a method of press bending glass sheets, the method including providing an initially bent glass sheet carried on an articulated gravity bending mould and press bending the glass sheet to a final bent shape by an upper press bending mould which is lowered onto the upper surface of the glass sheet, the upper press bending mould having a net weight of from 50 to 150 kg.

20 Claims, 4 Drawing Sheets

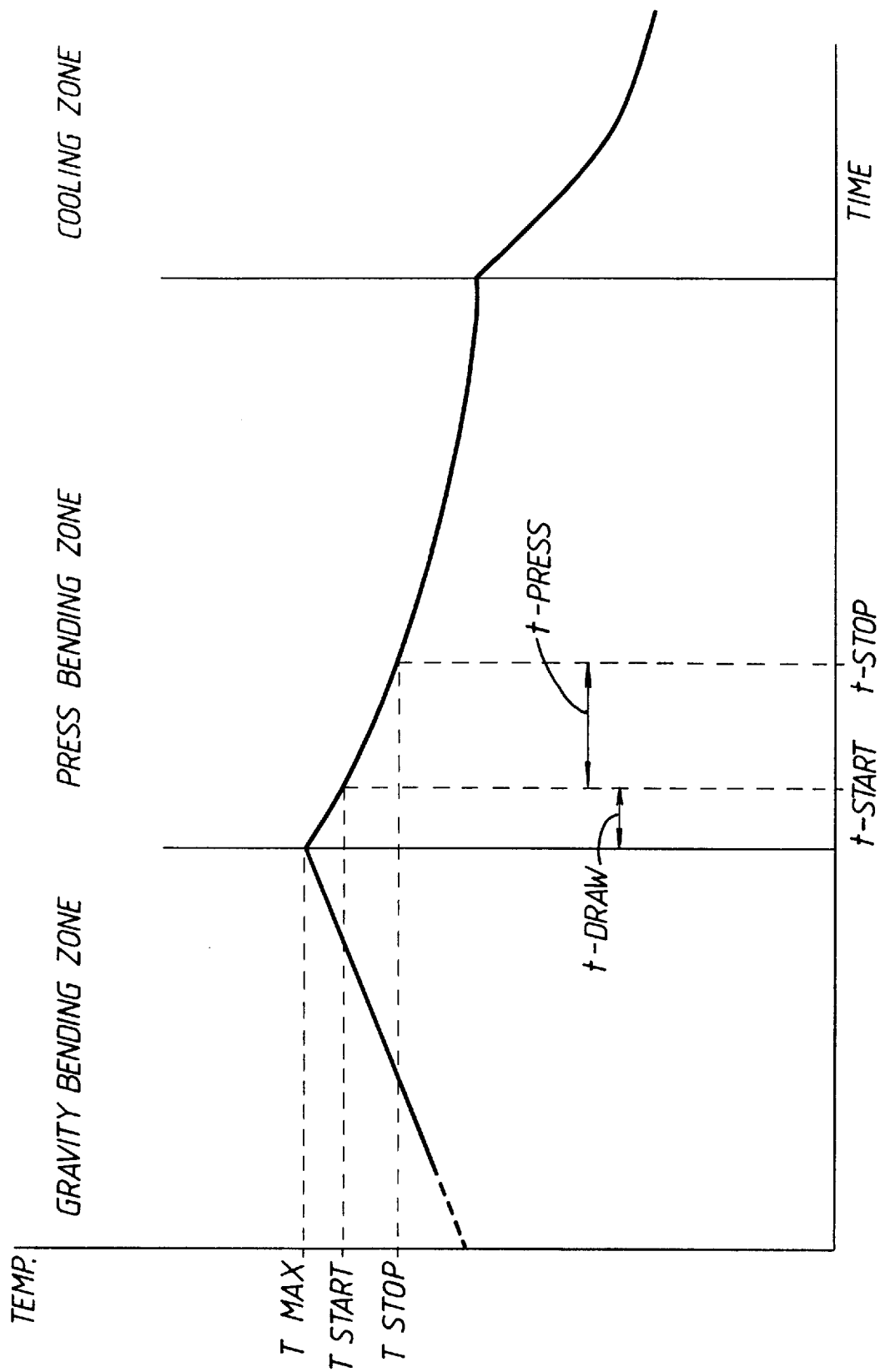

METHOD OF BENDING GLASS SHEETS

BACKGROUND TO THE INVENTION

The present invention relates to a method of bending glass sheets and more particularly to the bending of glass sheets in which there is an initial gravity bending step and a subsequent press bending step. The method is particularly useful for bending automotive glass for subsequent laminating, for example to manufacture vehicle windshields.

DESCRIPTION OF THE PRIOR ART

Glass for the windows of vehicles is normally curved, the curvature being imparted to planar glass by a bending process. In one such bending process planar glass sheets are placed upon female ring moulds and heated to the glass softening point. Each sheet bends ("sags") under its own weight until the periphery of the glass sheet is in contact with the ring mould. Such a bending technique is known as "sag" or gravity bending, and it has been developed over the years so as to bend glass sheets which meet the demands of vehicle manufacturers.

For example, as more deeply bent glass was required, the ring mould was modified by attaching the ends of the mould to the central portion by hinges, the hinged mould ends or wing portions progressively closing as the glass softened and the bend proceeded. This avoided the tendency for the glass sheet to slide relative to the mould during the bend, thereby preventing scratching. Such a mould is commonly termed an articulated mould.

The gravity bending process has been found particularly suitable for the production of glass that is to be subsequently laminated by combining two sheets of glass with a sheet of interlayer material. The gravity bending process is capable of producing glass to a high optical quality, and it is also possible to bend two sheets of glass simultaneously thereby producing a matched pair of glasses which give an excellent fit on laminating.

In recent years, developments in vehicle design have required glass of complex curvature, i.e. glass that is bent in two directions generally at right angles that each other. It is not possible to impart more than a very limited degree of complex curvature to a sheet of glass by gravity bending alone.

Furthermore, increased use of automated assembly by vehicle manufacturers demands that tighter dimensional tolerances be met by the glass. The shape of the periphery of the bent pane must be accurate, not only in terms of its two dimensional projection, but also in three dimensions, i.e. the angle of the glass adjacent the periphery must be correct. If this "angle of entry", as it is known to those skilled in the art, is not correct, the bent pane will not fit and seal satisfactorily in the receiving flange of the vehicle bodywork.

Moreover, the optical properties of the window depend on the shape of the central region of the glass which must therefore be accurately controlled in order that the required optical standards may be met.

These requirements, in conjunction with the trend towards deeper, and more complex bends, can no longer be met by glass bent by the gravity bending technique alone. It is now regarded as necessary to complete the bending of such shapes by a subsequent press bending step. This step may only involve a limited part of the area of the bent pane, for instance the areas that, after installation in a vehicle body, will be adjacent the windscreen pillars of said body. In many current vehicle designs, such areas of the pane are required to be more deeply bent, and in this specification, any area of a pane which is required to be more deeply bent by means of a subsequent press bending step will be referred to as a deep bend portion.

In the press bending step, an upper mould or die is lowered onto the upper surface of the glass sheets so that the glass sheets are further bent by the action of the upper mould pressing the sheets against a lower mould. When the press bending step is carried out after initial gravity bending, the lower mould may comprise the gravity bending mould.

U.S. Pat. No. 4778507 discloses a method for bending glass sheets in which a press bending step is carried out subsequent to a gravity bending step. It is disclosed that the pressing zone is preferably maintained at a temperature in the range of from 500° to 660° C. It is also disclosed that the pressing time is preferably 0 to 60 seconds. It is further disclosed that following the pressing operation, the glass plates are gradually cooled at a typical cooling rate of 20° to 200° C. per minute. U.S. Pat. No. 5071461 also relates to a method of bending glass sheets in which a heating furnace heats glass sheets to be bent to a temperature from 550° to 650° C. EP-A-0300416 discloses in-lehr press bending in which a gravity bending station is maintained at an ambient temperature of from 621° to 638° C. and in a downstream press bending station, the pressing moulds are maintained at a designated elevated temperature that approximates to the ambient temperature in the press bending station.

GB-A-2063851 discloses a method of bending glass sheets in which the ambient temperature in a gravity bending zone is maintained at from 621° to 638° C. and the ambient temperature of a press bending zone is maintained at approximately 582° C.

While the aforementioned patent specifications disclose a variety of process parameters relating to temperature and processing times for use in gravity bending and in a subsequent press bending step, there is nevertheless a need in the art for a controllable glass bending method in which the initial gravity bending and subsequent press bending of glass sheets can be reliably employed to produce glass sheets having deep bent portions which achieve the required maximum stress threshold and the required optical characteristics for the glass sheets. In addition, there is still a need in the art for a glass sheet bending method which by selection of appropriate process parameters enables the process to be readily controllable so as to achieve the required characteristics in the finished product when manufactured in a production furnace.

Press bending is also employed in the art to bend planar glass sheets without initial gravity bending. However, this can lead to disadvantages in that because the bent profile is achieved by an applied pressing force by squeezing individual sheets between two moulds, the optical and physical properties of the glass sheets can be reduced as compared to gravity bending. Also, stresses may be induced in the glass sheets which can cause breakage or require an additional annealing step to remove them. Accordingly, the apparatus and methods employed in press bending alone i.e. not following a gravity bending step, can be different from those employed in subsequent press bending following initial gravity bending.

GB-A-2011377 discloses a process and apparatus for bending glass in which a flat glass sheet is bent between an upper male die and a lower female die. The upper die has an effective weight of 200 kg. The use of such a high weight die can lead to marks being inadvertently introduced in the glass surface and to stresses being induced in the glass.

SUMMARY OF THE INVENTION

It is an object of the present invention to provide a glass sheet bending method in which the process can be controlled so as to enable the process readily to be employed in production while ensuring avoidance of undesired marking of the glass sheets and induction of stresses in the glass sheets.

It is also an object of the present invention to provide a glass sheet bending method which controls the press bending step in such a way that both high optical quality and low stresses can be present in a bent glass sheet product.

It is another object of the present invention to provide a glass sheet bending method which enables the use of a lighter die than in the prior art thereby avoiding inadvertent marking of the glass sheets.

It is a further object of the present invention to provide a glass sheet bending method in which by controlling the process parameters thereby to enable a lighter die as compared to the prior art to be employed. This not only minimises marking of the glass sheets, but also enables the process to be readily controllable so as not inadvertently to induce undesirable stresses into the glass.

The present invention provides a method of bending glass sheets, the method comprising the steps of gravity bending a glass sheet at elevated temperature on a gravity bending mould in a gravity bending zone of a furnace, press bending the gravity bent glass sheet to a desired shape with an upper mould while the glass sheet is supported by the gravity bending mould as a lower mould in a press bending zone of the furnace and controlling the ambient temperature in the press bending zone thereby to control the cooling rate of the glass sheet in the press bending zone.

The present invention further provides a method of press bending glass sheets, the method comprising providing an initially bent glass sheet carried on an articulated gravity bending mould and press bending the glass sheet to a final bent shape by an upper press bending mould which is lowered onto the upper surface of the glass sheet, the upper press bending mould having a net weight of from 50 to 150 kg.

BRIEF DESCRIPTION OF THE DRAWINGS

An embodiment of the present invention will now be described by way of example only, with reference to the accompanying drawings, in which:

FIG. 8 is a graph representing the change in temperature of glass sheets before, during and after a press bending operation.

DETAILED DESCRIPTION OF THE PREFERRED EMBODIMENT

Figure 1:
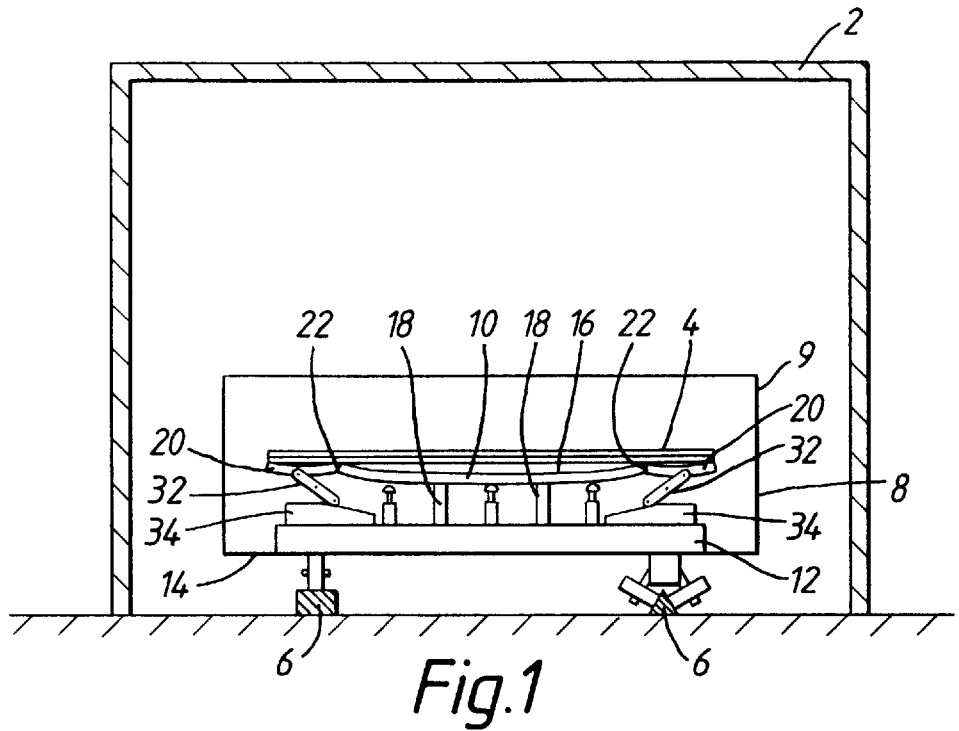
FIG. 1 is a schematic part-sectional side view through a furnace for heating glass sheets showing a gravity bending mould carrying a pair of flat glass sheets prior to a gravity bending operation.

Referring to FIG. 1, there is shown a section through a tunnel furnace 2 for bending glass sheets, typically a pair of glass sheets 4 which, after the bending operation, are intended to be laminated together in order to manufacture, for example, an automobile windshield. Such a tunnel furnace 2 is well known in the art and consists of an elongate track 6 carrying a succession of wheeled open-topped carriages 8 thereon. Each carriage 8 has a gravity bending ring mould 10 therein, the mould 10 being mounted on a base 12 which is fixed to a solid bottom wall 14 of the carriage 8. The carriage 8 also has an annular, preferably rectangular, side wall 9. The carriages 8 are mounted in succession for cyclical movement around a loop including the furnace 2. The loop includes a glass loading zone, a heating zone in which the heated glass sheets are gravity bent on the gravity bending mould 10, a cooling zone, and a glass unloading zone. The furnace 2 may be provided with other zones, for example an annealing zone, for annealing the glass so as to reduce stresses generated during the bending step, between the heating zone and the cooling zone. It will be understood by the skilled person that although the present invention is exemplified by a box furnace, the present invention can alternatively be employed in any other type of lehr.

The present invention is particularly concerned with the manufacture of glass sheets having deep bend portions which cannot readily be achieved by the use of gravity bending alone. In accordance with the invention, a press bending zone is additionally provided in the loop immediately downstream of the gravity bending zone. In the press bending zone, the gravity bent glass sheets are further press bent to a final desired shape by an upper reciprocable mould while the glass sheets are supported on the gravity bending mould.

FIG. 1 illustrates glass sheets 4 on the mould 10 in a carriage 8 prior to the gravity bending operation. The carriage 8 is arranged to move along the furnace 2 in a direction at a right angle to the plane of the drawing. The mould 10 comprises a central fixed mould portion 16 which is mounted to the mould base 12 by a plurality of supports 18. On opposed sides of the central portion 16 of the mould 10 are hingedly mounted respective articulated wing portions 20. Although the invention is described with reference to a gravity bending mould having two opposed wing portions, it will be apparent to those skilled in the art that the invention could also utilise a gravity bending mould having only one articulated wing portion. The wing portions 20 are arranged to move by rotation between a lower position, as shown in FIG. 1, wherein the mould 10 is configured to support one or more flat glass sheets 4 on the mould 10, and a higher position at which the wing portions 20 define, together with the central portion 16, a continuous curved annular rim defining a surface to be attained by the glass sheet or sheets 4 when finally bent. The glass sheets 4 are heated as they pass through the heating zone of the furnace 2 so that the glass sheets 4 are progressively softened and sag under the effect of gravity so as to conform to the desired shape as defined by the mould 10. Above the central portion 16 of the mould, the glass sheets 4 sag until they rest against the upper mould surface thereby conforming to the desired shape. Above the wing portions 20, the effect of the softening of the glass permits the wing portions 20 to be articulated upwardly under the action of an applied force provided by a pair of counterweights so that each wing portion 20 rotates about a respective pivot axis 22 at the juncture between the central portion 16 and the respective wing portion 20 so that the glass sheets 4 are pushed upwardly and are progressively bent until the bottom surface of the glass sheets 4 rests against the upper surface of the wing portions 20. As will be described hereinafter, when deep bend portions are present in the glass sheets, those portions tend to require to be mechanically pressed against the lower mould by an upper die or mould so that the desired shape defined by the lower mould is reliably and repeatably achieved. It will be apparent that the present invention may employ so-called "weightless" moulds which do not have counterweights but rather are specially configured so that the mould articulates under the action of the weight of the glass as it softens.

Figure 4:
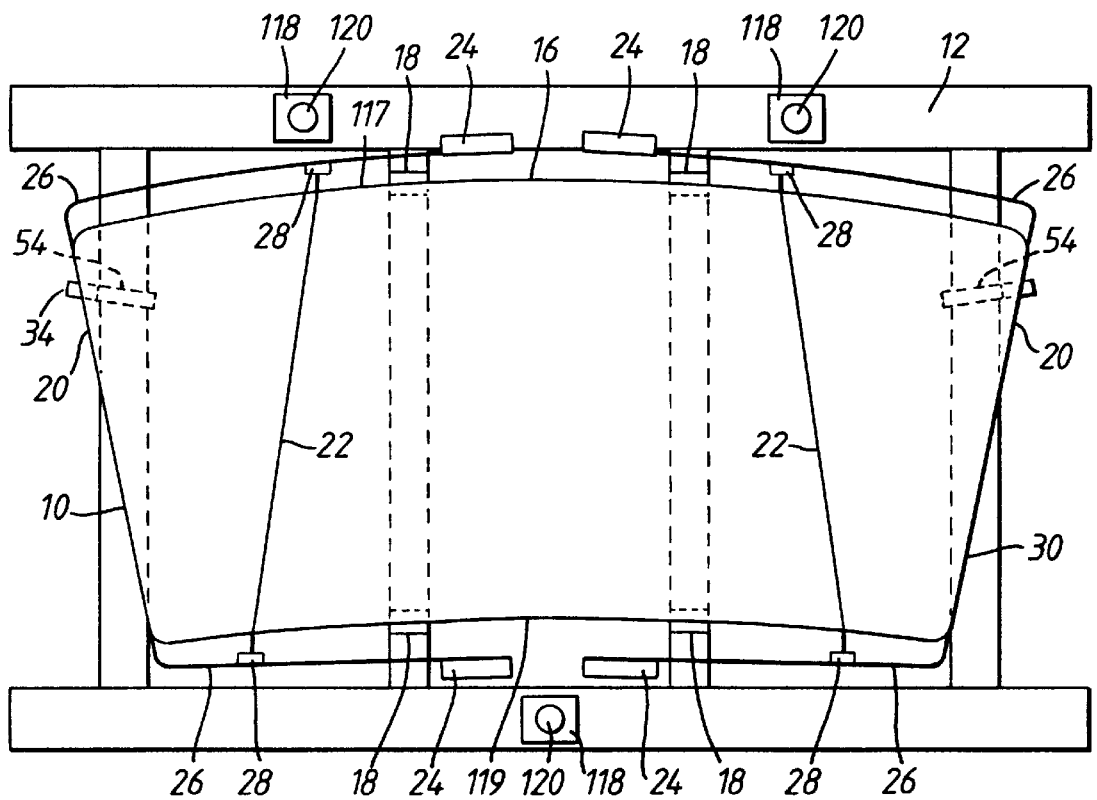
FIG. 4 is a plan view of the gravity bending mould mounted on a base in a carriage as illustrated in FIG. 1.

A typical mould 10 is illustrated in greater detail in FIG. 4. The mould 10 is mounted above the base 12 by the supports 18 which are fixed to the underside of the central portion 16 of the mould 10. The base is sufficiently rigid so as to minimise deflection during the subsequent press bending step. The wing portions 20 are connected to the central portion 16 on opposed sides thereof by respective pivot axes 22. Each wing portion 20 has mounted thereto on opposed sides thereof a pair of counterweights 24, each counterweight 24 being mounted on a respective arm 26 which is fixed to a respective end 28 of a respective pivot axes 22. The upper surface of the rim 30 of the mould 10 formed by the central portion 16 and the wing portions 20 contacts the underside of the glass sheets 4 and defines a final desired shape for the glass sheets 4. The surface area of the mould 10 contacting the glass sheets 4 is preferably minimized so as to reduce the area available for heat transfer between the glass sheets 4 and the metal mould 10 which can lead to undesirable stresses being present in the finally bent glass sheets 4 and/or visible defects being present in the edges of the glass sheets 4. Such stresses can cause breakage of the glass sheets 4. Typically, it is desired to keep tensile area stresses in the glass sheets to less than 7 MPa. Typically, the annular rim 30 of the mould 10 defined by the upper surfaces of the central portion 10 and the wing portions 20 has a thickness of from about 3 to 4 mm so as to minimise the area of contact between the glass and the mould 10. However, when, in accordance with the present invention, the gravity bending mould 10 is intended to be employed as the lower mould in a subsequent press bending operation, it is required for the lower mould to be sufficiently rigid and strong so that it does not uncontrollably deflect or distort under the action of the applied pressure from the upper press bending mould. It is also required that the thin rim does not mark the underside of the glass during the press bending operations In accordance with the present invention, the glass sheet bending apparatus is especially adapted so as to permit a conventional sag bending mould having a relatively thin annular rim to be employed in a subsequent press bending operation whilst ensuring high quality control of the finally bent glass sheet products. The use of such a thin annular rim provides low stresses in the glass as described hereinabove. Modifications have been made to the mould and to remaining parts of the apparatus so as to ensure that the mould reliably ensures that the required final shape is achieved, the mould can withstand the press bending operation and the glass sheets are not inadvertently marked or otherwise deteriorated in quality as a result of the additional press bending operation.

Referring back to FIG. 1, the wing portions 20 are each provided with at least one locking device for vertically locking the position of the wing portion during the press bending operation. Optionally, each wing portion has two locking devices although the illustrated embodiment is only provided with one locking device for each wing portion. The locking device comprises a hinged locking arm 32 which is hingedly mounted to the respective wing portion 20 and depends downwardly therefrom so as to be able to slide over the top surface of a plate 34, mounted on the base 12, which provides an upper cam surface.

Figure 2:
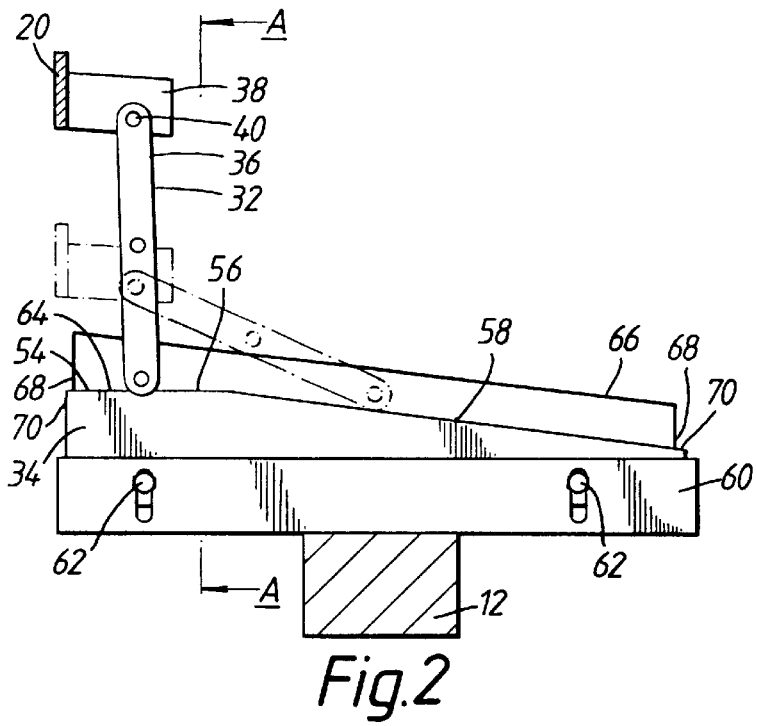
FIG. 2 is an enlarged schematic part-sectional side view of one of the wing locking devices shown in FIG. 1.
Figure 3:
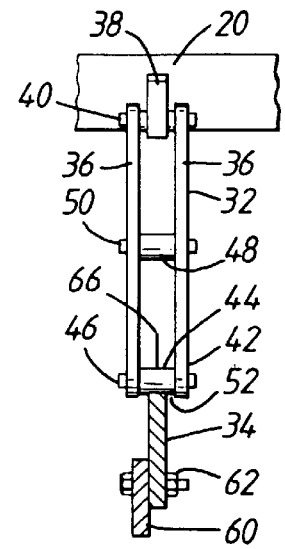
FIG. 3 is a schematic part-sectional side view on line A—A of FIG. 2.

The locking arm 32/plate 34 assembly is shown in greater detail in FIGS. 2 and 3. The locking arm 32 comprises a pair of elongate spaced plates 36 which are hingedly mounted at their upper ends to an extension member 38 fixed to the respective wing portion 20, the extension member 38 passing between the plates 36 and the pivotal mounting therebetween comprising a bolt assembly 40. The locking arm 32 depends downwardly from the wing portion 20 and the free bottom end 42 thereof is provided with a cylindrical spacer 44 which is fixed between the plates 36 by a further bolt assembly 46. The cylindrical spacer 44 is clamped between the elongate plates 36 so as to be prevented from rotational movement relative thereto. A further spacer 48 and bolt assembly 50 are provided substantially at the centre of the locking arm 32.

The locking arm 32 is free to pivot relative to the wing portion 20 about the extension member 38 and the lower surface 52 thereof rests on the upper surface of the plate 34 which comprises an elongate cam surface 54 over which the free bottom end 42 of the locking arm 32 can slide. The cam surface 54 comprises a substantially horizontal portion 56 and an adjacent inclined ramp portion 58. The ramp portion 58 is preferably inclined at an angle of around 20° to the horizontal and if desired the substantially horizontal portion 56 can be slightly inclined to the horizontal by a few degrees in the same sense as the ramp portion 58. The plate 34 is adjustably mounted in an upright configuration to the base 12 via a mounting plate 60 to which the plate 34 is removably secured by bolt assemblies 62. The plate 34 can readily be adjusted in height and tilt.

In FIG. 1, the wing portion 20 is shown in its lowered configuration and in this configuration the locking arm 32 is inclined to the horizontal in an unlocked position and the free end 42 thereof rests on the ramp portion 58 of the cam surface 54 of the plate 34. Such a configuration is illustrated in phantom in FIG. 2. During the gravity bending step, the wing portion 20 rotates upwardly under the action of the counterweights 24 which progressively causes the glass sheet to be increasingly bent as it softens on heating. The wing portion 20 moves from the phantom position illustrated in FIG. 2 to the position shown by the solid lines in FIG. 2. It will be seen that as the wing portion 20 rises during the gravity bending step, the free end 42 of the locking arm 32 slides upwardly along the ramp portion 58 until it reaches the substantially horizontal portion 56 which defines a locking zone 64 for the locking arm 32. The locking arm 32 moves in a plane perpendicular to the pivot axis 22. As is shown in FIG. 4, the plate 34 defining the cam surface 54 is at right angles to the respective pivot axis 22 so that as the wing portion 20 is rotated upwardly about the respective pivot axis 22, the free end 42 of the locking arm 32, and in particular the lower surface 52 of the spacer 44, slides steadily up the ramp portion 58 until the locking arm 32 is substantially vertical, with the free end 42 thereof being positioned in contact with the locking zone 64. As shown in FIG. 2, in order to ensure that the locking arm 32 does not inadvertently move laterally off the cam surface 54, a wire 66 connected at opposed ends 68 thereof to respective opposed ends 70 of the plate 34 and which passes between the spaced plates member 36 of the locking arm 32 may be provided.

As shown in FIG. 2, the locking arm 32 in its locking position is substantially vertical. Preferably, the height and inclination of the plate 34 is adjusted so that in the locking position the locking arm 32 is not quite vertical but is a few degrees slightly inclined to the vertical, the inclination being in the same sense as that for the unlocked position. In the locking position the lower surface 52 of the non-rotatable spacer 44 frictionally engages the cam surface 54 in the locking zone 64. Since the locking zone 64 is substantially horizontal and the locking arm 32 is substantially vertical, during the subsequent press bending operation, which is described in detail hereinafter, in which a downward pressing force is applied to the wing portion 20 in its upwardly rotated position, a corresponding force is transmitted down through the locking arm 32 and thence to the base 12 through the plate 34 and the mounting plate 60 to which the plate 34 is mounted. Such a downward pressing force on the wing portion 20 is transmitted with minimal downward deflection or distortion of the wing portion 20. The locking arm 32 acts as a rigid and locked support strut for the wing portion 20 as a result of the frictional engagement between the locking arm 32 and the locking zone 64 of the cam surface 54. This enables an articulated mould 10 having a relatively thin annular rim 30 to be employed in a subsequent press bending operation.

It will be appreciated that an operator is required to set up the locking arm 32/plate 34 assembly when the apparatus is cold. However, the apparatus is required to operate satisfactorily and reliably at elevated temperatures in the furnace, for example at around 600° to 650° C. The initial setting up must take account of expansion of the various parts of the apparatus on heating as well as slight distortion of the mechanical parts as a result of thermal cycling and also mechanical wear over time. It is obviously preferred that the apparatus be easy to be set up by an operator. Accordingly, the locking arm 32/plate 34 assembly is preferably configured so that the locking arm 32 is not quite vertical in the press bending step. This ensures that even if distortion and wear were to occur, the locking arm 32 could not rotate past the vertical position and slide off the end 70 of the plate 34. This additionally permits, over a large number of heating cycles, a range of potential locking positions to be defined along the locking zone 64 corresponding to a range of slightly varying heights (relative to the base 12) of the the wing portion 20 to which the locking arm 32 is attached. This can readily compensate for any distortion and wear which may occur as a result of successive thermal cycles. The final angular position and thus the height of the wing portion 20 is defined by stop members on the arms 26 carrying the counterweights 24 which define a final position for the mould corresponding to the final desired shape of the glass sheets. However, it is possible for the height of the wing portion 20 slightly to vary with respect to the base 12 as a result of thermal cycling and the provision of a locking range ensures that the locking arm operates to act as a support strut for the wing portion 20 of the mould 10 during the press bending operation despite such thermal cycling having caused a slight change in the final angular position of the locking arm 32. This obviates the need for regular checking and adjustments to the locking devices. Preferably, the locking zone 64 is inclined slightly upwardly so as to permit smooth sliding movement by a camming action of the free end 42 of the locking arm 32 along the cam surface 54. The locking arm 32/plate 34 assembly is easy to set up manually merely by adjusting the height and orientation of the plate 34 relative to the base 12, and thus relative to the locking arm 32 on the respective wing portion 20.

Figure 5:
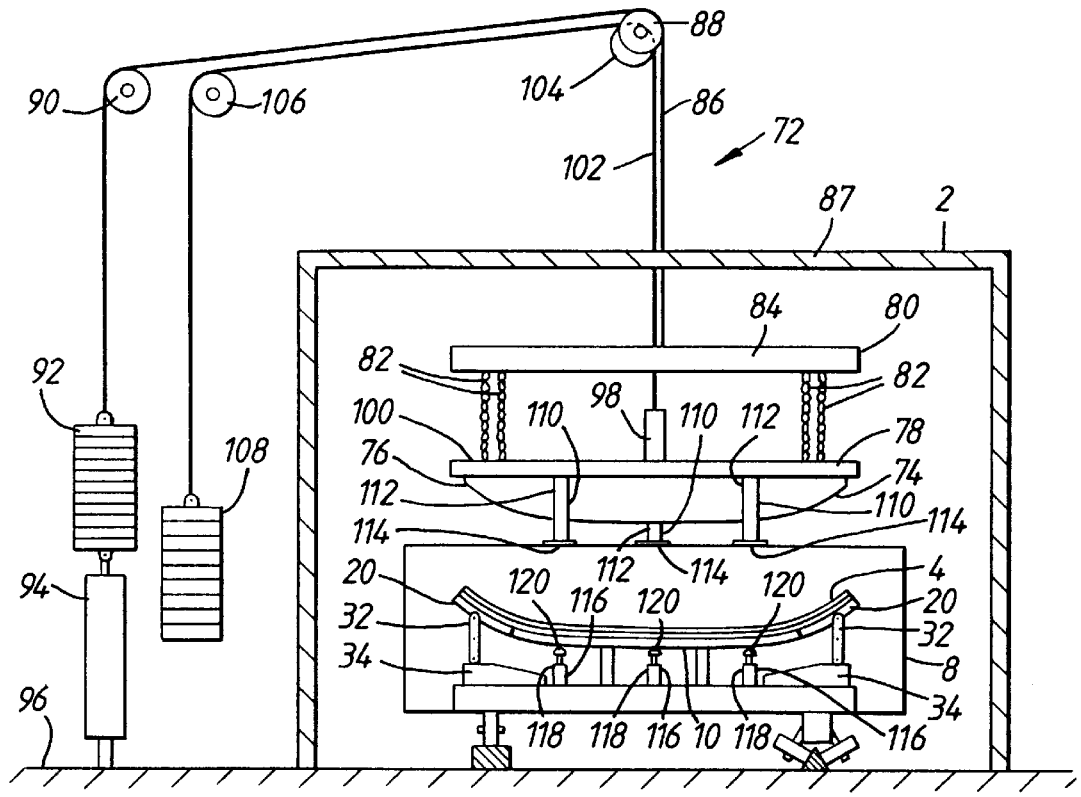
FIG. 5 is a schematic part-sectional side view, similar to that of FIG. 1, showing an apparatus for press bending glass sheets in the furnace, the apparatus being illustrated prior to a press bending operation.

The final configuration of the mould 10 after the gravity bending operation and prior to the press bending operation is illustrated in FIG. 5.

Although the embodiment illustrated in FIGS. 1 to 4 shows only one locking arm mounted on each wing portion 20, if desired two or more locking arms may be provided on each wing. After the press bending operation which is described hereinafter, and after the press bent glass sheets have been removed from the mould at the unloading zone, the wing portion 20 can be reset to its initial lower configuration by an operator manually pushing the locking arm 32 inwardly so as to disposed in the configuration illustrated in phantom in FIG. 2. If desired, this operation could be performed automatically, for example by a robot.

Referring to FIG. 5, there is shown the press bending apparatus, designated generally as 72, at the press bending zone in the tunnel furnace 2, the press bending apparatus 72 being illustrated prior to the press bending operation. At the press bending zone, the carriage 8 containing the mould 10 carrying the gravity bent glass sheets 4, with the wing portions 20 being disposed in their upwardly rotated orientation and with the locking arms 32 being in a substantially vertical orientation and bearing downwardly against the upper surface of the respective plates 34 as described hereinabove, is conveyed to a pre-set position at which the glass sheets 4 are positioned so as to be disposed beneath the press bending apparatus 72. The press bending operation is employed when it is desired to complete the bending of the glass sheets 4 to the required shape so that the resultant finally bent glass sheets 4 have a shape defined by the gravity bending mould 10.

The press bending apparatus 72 comprises an upper mould or die 74 having a lower mould surface 76 which constitutes a male mould surface substantially corresponding to the female mould surface defined by the gravity bending mould 10. The glass sheets 4 are intended to be press bent between the upper mould 74 and the gravity bending mould 10 so as to attain the required shape. The upper mould 74 preferably comprises a ceramic body. As shown in FIG. 5, the upper mould 74 may comprise a unitary mould. However, in alternative configurations the upper mould 74 may comprise a pair of spaced mould parts which are arranged to be pressed against only those portions of the glass sheets 4 which are required to be deeply bent i.e. in the vicinity of the wing portions 20.

The upper mould 74 is supported by a sub-frame 78. The sub-frame 78 depends downwardly from a support frame 80 by a plurality of chains 82. Preferably, there are four chains 82, each located at a respective corner of the upper mould 74. Metal cables may be employed instead of chains. The support frame 80 has connected to the upper surface 84 thereof a cable (or chain) 86 which extends upwardly from the centre of the support frame 80 through the roof 87 of the tunnel furnace 2, over a first pulley 88 so as to be substantially horizontal, over a second pulley 90 so as to depend vertically downwardly with the end of the cable 86 being connected to a first counterbalance 92 which is in turn connected to a die moving mechanism 94. The counterbalance 92 and the die moving mechanism 94 are located laterally adjacent the tunnel furnace 2 on one common longitudinal side thereof. The die moving mechanism 94 preferably comprises a hydraulic or pneumatic piston/cylinder assembly which is connected at the bottom end thereof to the floor 96. In FIG. 5, the upper mould 74 is illustrated in its raised configuration with the piston/cylinder assembly 94 being in a retracted configuration. In the raised configuration of the upper mould 74, the carriage 8 can be moved from an upstream part of the tunnel furnace 2 into position beneath the upper mould 74 prior to the subsequent press bending operation. The counterbalance 92 is provided with a desired weight so as to minimize the work required to be expended by the piston/cylinder assembly 94 in raising and lowering the upper mould 74 but with the proviso that in the event of failure of the piston/cylinder assembly 94, the weight of the first counterbalance 92 is sufficiently high so that the entire apparatus fails safely so as to pull the upper mould assembly 74 upwardly away from the carriages 8 passing thereunder.

A second counterbalance assembly is also provided for permitting the upper mould 74 to rest on the glass sheets 4 during the press bending step with a predetermined net weight. A rigid metal rod 98 extends upwardly away from the centre of the upper surface 100 of the sub-frame 78 for the upper mould 74. A second cable 102 is connected to the upper part of the rod 98 and extends successively through holes (not shown) in the support frame 80 and the furnace roof 87, and thence over a pair of pulleys 104,106 so as to be connected to at the other end thereof to a second counterbalance 108 which is free to move vertically. If desired, for both the first and second counterbalances 92,108 vertical rails or supports (not shown) may be provided so as to prevent inadvertent lateral movement of the counterbalances 92,108. The second counterbalance 108 has a specific weight which is selected so as to provide a specific predetermined net weight to the combined assembly of the upper mould 74 and the sub-frame 78 to which the mould 74 is mounted. The net weight of the upper die assembly is preferably 100+/−50 kg, more typically from 50 to 100 kg depending on the particular mould configuration and the size and desired shape of the bent glass sheets. The cable 102 between the second counterbalance 108 and the upper mould 74 is always in tension. The metal rod 98 is provided between the cable 102 and the sub-frame 78 so as to reduce inadvertent stretching or deformation of the cable 102 in the vicinity of the upper mould 74 where the ambient temperature in the pressing zone is high. The cable 86 between the mounting frame 80 and the first counterbalance 92 is also always in tension. As described hereinbelow, during the press bending step the chains 82 are permitted to go slack so that during the press bending operation it is only the selected net weight of the upper mould 74 and its associated sub-frame 78 which is applied to the upper surface of the glass sheets 4.

Figure 7:
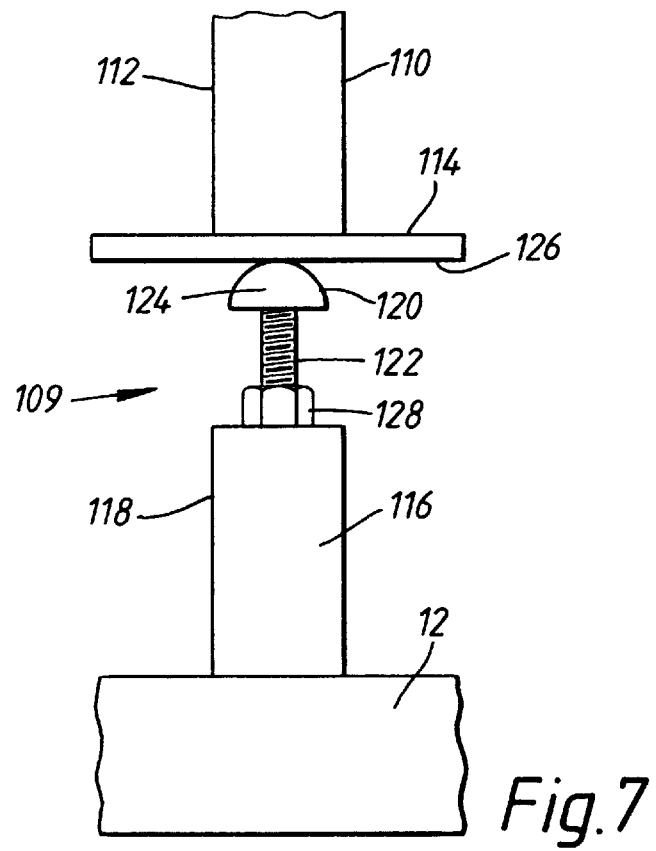
FIG. 7 is an enlarged side view of one of the spacer devices illustrated in FIG. 6.

On opposed sides of the upper mould 74 and adjacent thereto are provided a plurality of spacer devices 109. The spacer devices 109 each include an upper stop member 110, comprising a vertical body 112 having fixed thereto at the bottom end thereof a substantially horizontal plate 114. The upper stop members 110 are firmly mounted on the sub-frame 78. A corresponding plurality of lower stop members 116 of the spacer devices are mounted on the base 12. Each lower stop member 116 comprises an upwardly extending body 118 having mounted at its upper end a vertically adjustable spacer member 120. As is shown in greater detail with reference to FIG. 7, each spacer member 120 comprises a bolt portion 122 having a domed head portion 124 which is substantially hemispherical and the upper surface of which is arranged, during the press bending operation, to bear against the lower surface 126 of the plate portion 114 of the respective upper stop member 110. The bolt portion 122 is threaded into the upwardly extending body 118 so as to be readily adjustable in height and a threaded nut 128 is provided so as to permit fixing of the domed head portion 124 at the required height. Preferably, the plate portion 114 and the domed head portion 124 are composed of steel. The upper and lower stop members 110,116 are provided in registry in pairs. Preferably, three pairs of stop members 110,116 are provided. With such a configuration, as is shown in FIG. 4, two pairs of stop members are provided on one long edge 117 of the mould 10 in spaced relation and a third pair of stop members 110,116 is provided centrally along the opposite long edge 119 of the mould 10.

The spacer devices 109 are provided so as to ensure that the upper and lower moulds 74,10 are separated over substantially their entire area by a gap corresponding to the thickness of the glass sheets 4 in their final shaped form. This ensures that any over-pressing of the glass sheets 4, which can result in marking of the glass sheets 4 by the annular rim 30, is substantially avoided. As is described in detail hereinafter, three spacer devices 109 are preferably provided so that it is ensured that the vertical position of the upper mould 74 relative to the lower gravity bending mould 10 is determined without inadvertent relative rocking of the moulds 74,10 occurring. This increases the possibility of correct spacing being reliably achieved. As with the arrangement of the locking arms 32, it is necessary for the spacer devices 109 to be set up by an operator when the apparatus is cold but the spacer devices 109 must ensure proper spacing of the upper mould 74 and the lower mould 10 at elevated temperatures during the press bending operation, which can entail inadvertent expansion or other deformation occurring as a result of thermal cycling. The provision of three pairs of stop members 110, 116 ensures that the gap between the upper and lower mould 74,10 can reliably be set without any rocking of the upper mould 74 relative to the lower mould 10 in the final press bend configuration of the moulds 10,74.

It will be appreciated that in a typical tunnel furnace 2 a plurality of carriages 8 is provided, each containing a respective gravity bending mould 10. A typical furnace 2 includes at least twenty carriage 8/gravity bending mould 10 assemblies. However, only one press bending upper mould 74 is provided. It is necessary in operation for each lower gravity bending mould 10 and its associated carriage 8 to be properly set up with respect to the single upper press bending mould 74. Accordingly, the spacer devices 109 for defining the correct adjustable gap between the moulds 10,74 are provided in conjunction with each respective gravity bending mould 10 so that each gravity bending mould 10 can be individually set up to operate correctly with the single upper mould 74. Each spacer device 109 is individually adjusted prior to initial operation of the furnace so that during the press bending operation, when the upper mould 74 is lowered onto the glass sheets 4 carried on the gravity bending mould 10, the upper and lower moulds 74,10 are correctly spaced from each other a distance corresponding to the thickness of the glass sheets 4 in their final bent form.

Figure 6:
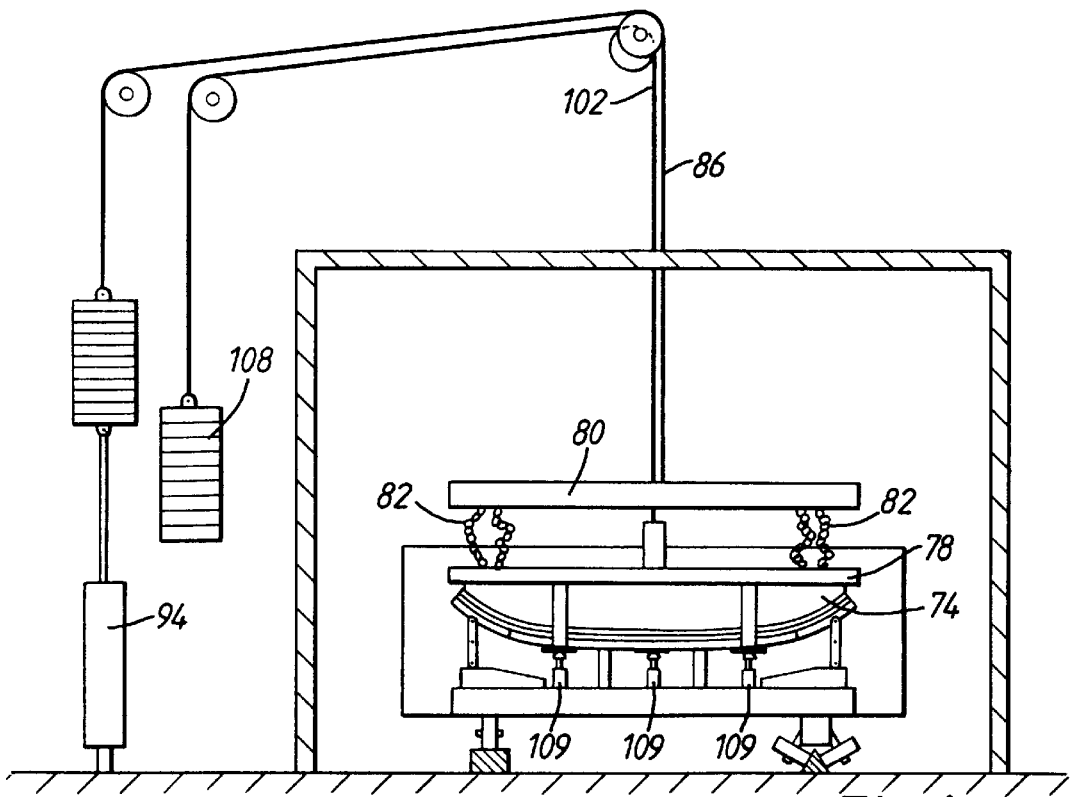
FIG. 6 shows the apparatus of FIG. 5 during a press bending operation.

The press bending operation will now be described with reference to FIG. 6. When the lower mould 10 carrying the glass sheets 4 thereon is presented beneath the upper mould 74, the piston/cylinder assembly 94 is actuated so as to lower the support frame 80 supporting the upper mould 74 until the upper mould 74 is in contact with the underlying glass sheets 4 on the gravity bending mould 10. The stroke of the piston/cylinder assembly 94 is greater than that required just to cause contact of the upper mould 74 with the glass sheets 4. The support frame 80 thus overtravels so as to continue to be lowered after contact of the upper mould 74 with the glass sheets 4 so that the support frame 80 has been lowered so as to be nearer to the sub-frame 78 than in the initial configuration illustrated in FIG. 5. This over-lowering of the support frame 80 causes the chains 82 to go slack. In this configuration, the upper mould 74 and its associated subframe 78 bear downwardly on the glass sheets 4 with the desired net weight which has been selected by appropriate selection of a particular weight for the second counterbalance 108. The upper mould 74 thus presses the upper surface of the glass sheets 4 with a predetermined net weight.

Moreover, since the upper mould 74 is not supported from above during the press bending operation at least towards the end of the press bending operation, the weight of the upper mould 74 is uniformly distributed across the entire abutting surfaces, typically over an area of around $1m^2$, of the upper mould 74 and the underlying glass sheets 4. This ensures even weight distribution over the glass sheets 4 during the press bending operation. The press bending operation typically lasts for up to 20 seconds, more typically from 5 to 15 seconds, still more typically from 10 to 15 seconds. Towards the end of the press bending operation in which the glass sheets have been pressed into intimate contact around their entire periphery with the lower gravity bending mould 10 by the upper mould 74, for each of the spacer devices 109, the domed head 124 bears against the plate member 114 so as to define across substantially the entire area of the press bending mould a preset gap between the upper and lower moulds 74,10 corresponding to the thickness of the press-bent glass sheets. The provision of the stop members ensures that over-pressing of the glass sheets 4 during the press bending operation does not occur. This minimizes edge marking of the lower surface of the glass sheets 4 by the annular rim 30 of the gravity bending mould 10 which is a particular problem when employing a gravity bending mould having thin rims having a thickness on the order of around 3 to 4 mm.

In accordance with the method of the preferred embodiment of the present invention, in the press bending step the process parameters of the press bending step, for example temperature, time, etc. and the mechanical apparatus, in particular the configuration of the lower gravity bending mould and the configuration and net weight of the upper bending mould, are co-ordinated in order to provide improvements over prior art methods. These improvements are manifested not only in better controllability of the press bending step but also potential improvements in the quality of the products produced by the glass bending method.

FIG. 8 illustrates a typical relationship between temperature and time in an embodiment of a glass bending process in accordance with the present invention. In FIG. 8 and the following description of the temperature of the glass sheets, it should be understood that the references to temperature refer to the temperature of those portions of the glass sheets which require to be deep bent by the subsequent press bending process. The mean glass temperature of the entire sheet would be lower than the specified temperature in those portions intended to be deep bent. The heating zone is configured so as to enable the required temperature distribution over the area of the glass sheets to be readily achieved, for example by differential heating. In one preferred embodiment prior to the press bending operation, the underlying glass sheets 4 may be heated by a roof heater so as to provides a differential temperature profile over the surface of the glass sheets 4 so as to assist the glass sheets 4 attaining the required shape during the press bending operation. Such a differential roof heating technique is described in co-pending European patent application No. 94309435.9.

It will be seen from FIG. 8 that the temperature varies generally with the three consecutive steps of (a) gravity bending the glass sheets in an upstream gravity bending zone of the furnace, (b) press bending the gravity bent sheets in a downstream press bending zone of the furnace and (c) cooling the glass sheets in a yet further downstream cooling zone of the furnace. In the gravity bending zone, the temperature of the glass sheet increases during the gravity bending step and as the gravity bent glass sheets exit the gravity bending zone, the temperature of the portions of the glass sheets to be deeply bent is maximised at a temperature Tmax. For any particular bent glass sheet configuration, the value of Tmax lies within a relatively small range which is determined by the complexity of the shape of the glass for any given glass sheet composition and thickness. Typically, the deep bend portions of the glass sheet are at a temperature Tmax of around 625° to 640° C. as the glass sheet exits the gravity bending zone.

The temperature of the glass sheet in the gravity bending zone is required to be sufficiently high to ensure that the glass sheet viscosity is low enough to enable the sheet to sag correctly into its desired shape. However, if the temperature is too high, the optical qualities of the resultant product may be degraded. Typically, the ambient temperature in the gravity bending zone is around 650° C.

As the glass sheet enters the press bending zone, the glass sheet immediately starts to cool as shown in FIG. 8. In accordance with the method of the present invention, the cooling rate of the glass sheets in the press bending zone is controlled so as to be maintained at a relatively low value. After the glass sheets have been present in the press bending zone for a period of time within which the glass sheets have been positioned under the upper press bending mould 74 and the mould 74 has been lowered so as to be in contact with the upper surface of the glass sheets, which period is referred to as the draw time t-draw, the press bending operation is commenced. The press bending operation continues for a period t-press as shown in FIG. 8 after which the die is removed from the glass sheets. The draw time is determined by the mechanical conveying system for the female moulds to enable the glass sheets to be moved out of the gravity bending zone and into position beneath the upper mould and the time for initiating the operation of the upper mould.

The ambient temperature in the press bending zone is controlled so as to be relatively high, typically from 500° to 600° C., more typically from 550° to 580° C. This provides that the cooling rate of the glass sheets is controllably arrested as compared to the use of a lower ambient temperature in the press bending zone. The press bending operation is optimally carried out within a relatively high temperature range for the portions of the glass sheets which are to be press bent. For example, in FIG. 8 the press bending is commenced at a temperature Tstart and is terminated at a lower temperature Tstop. The temperature range at which the sheets are press bent controls the transient stresses induced in the glass sheets during the press bending. If the press bending is carried out at a relatively high glass temperature then the glass tends to be softer and any stresses induced in the glass sheets during the press bending operation are more readily relaxed because the stress relaxation time constant is shorter at higher temperatures. Thus in accordance with the preferred method of the invention, the press bending step is carried out at a relatively high press bending temperature in the press bending zone. When the die is removed from the glass the glass sheet retains the desired bent shape because the transient pressing stresses have been relaxed, and also the glass temperature is sufficiently lowered so that no further gravity bending occurs.

This requirement for the temperature of the glass sheets to be relatively high during press bending could potentially cause problems of controllability because of the consequential need to press bend the glass sheets shortly after they have exited the gravity bending zone so that the glass sheets have not cooled below the preferred press bending temperature zone. However, by maintaining the ambient temperature in the press bending zone relatively high, the cooling rate of the glass sheets is arrested and this in turn provides a broad time window within which the press bending operation can be performed satisfactorily. Accordingly, by controlling the rate of cooling of the glass sheets at the initiation of the entry of the glass sheets into the press bending zone, this provides improved process controllability of the press bending operation because there is greater freedom on time for the press bending operation to be performed. Furthermore, the provision of a relatively high temperature during press bending in a time-controlled manner enables the glass to be bent relatively slowly. This is preferred because the use of a relatively slow press bending step tends to provide reduced transient pressing stresses being induced in the glass sheets. Typically, the pressing period between t-start and t-stop as shown in FIG. 8 is up to 20 seconds, more preferably from 10 to 15 seconds.

This provision of the facility for longer pressing periods in turn enables a relatively lightweight die, as compared to those typically employed in press bending, to be utilized. Typically, the pressing load applied by the upper mould is 100+/−50 kg, more typically from 50 to 100 kg. The pressing load is selected depending upon the particular mould configuration and the size and desired shape of the bent glass sheets. The use of a relatively lightweight press load in turn leads to reduced incidence of glass sheet breakage or transient pressing stresses being induced in the glass sheets and also reduces the tendency for the glass sheets being marked by the moulds, in particularly the lower mould when the lower mould comprises a conventional gravity bending mould having the preferred thin annular rim as described hereinabove of thickness from about 3 to 4 mm. A lightweight pressing load also reduces tooling wear and maintenance as compared with the use of heavier loads which are typically employed in known press bending apparatus.

After the press bending step, the glass sheets continue to cool in a controllable manner in the press bending zone. The maintenance of a relatively high ambient temperature in the press bending zone controls the cooling rate following press bending so that the glass sheets are maintained at a sufficiently high temperature during this continued cooling to permit relaxation of any stresses which have been inadvertently induced into the glass sheets during the press bending operation and also annealing of the glass sheets. This controlled cooling permits control of residual area stresses in the glass sheets, particularly at the edges of the glass sheets to enable the resultant laminated product to meet the requirements of the vehicle manufacturer.

Preferably, in the press bending zone the average cooling rate of the glass sheets is less than 50° C. per minute, more preferably up to about 30° C. per minute, still more preferably from around 10° to 20° C. per minute. This provision of an arrested cooling rate in the press bending zone by the use of high ambient temperatures in the press bending zone relaxes the timing requirements of the press bending operation and the speed within which the press bending operation is initiated and carried out. This also enables the glass sheets to be removed from the gravity bending furnace at a relatively lower temperature for the deep bend portions, in the range, for example, of from 625° to 640° C., than would otherwise be required to maintain a particular press bending temperature range without the use of an arrested cooling range, which in turn can improve the optical quality of the glass sheets. This relaxation of timing requirements enables a relatively lightweight die to be employed, which can improve the physical and optical characteristics of the resultant press bent glass sheets.

The glass sheet is then removed from the press bending zone to a cooling zone in which the glass sheets are permitted to cool at a higher cooling rate than in the press bending zone. If desired, the cooling rate in the cooling zone may be controlled by the provision of low level radiant heating. The cooling rate is controlled so that any area stresses and toughening stresses induced in the glass sheets are within prescribed ranges. However, once the glass sheets are below about 500° C. which is lower than the strain point of the glass, then the cooling rate can be relatively high without the introduction of undesired stresses in the glass sheets.

In accordance with the preferred method of the present invention, the ambient temperature in the press bending zone is maintained at a high level. This in turn provides the upper mould with a relatively high working temperature without separate heating elements for the upper mould being required. This provides the advantage of reduced capital cost of the upper mould.

In the gravity bending furnace and the press bending zone, the ambient temperatures are controlled in known manner. For example by the provision of hot air burners or radiant heaters. In the cooling zone, known cooling configurations may be employed, for example the provision of black surfaces for receiving radiation from the cooling glass sheets and the provision of air flows behind the furnace roof so as to remove heat from the cooling zone.

Referring back to FIG. 6, the spacer devices 109 are specially configured to accommodate variations in the lateral positions of the upper mould 74 and the lower mould 10 because the domed head 124 can engage the plate member 114 over a selected range of lateral positions encompassed by the area of the plate member 114. This permits accurate spacing of the moulds to be achieved despite possible variations in the positions of the plurality of gravity bending moulds 10 around the bending loop. This arrangement does not restrict the lateral freedom of the positioning of the upper die 74 during press bending.

The upper mould 74 is supported by the support frame 80 by means of the chains 82 whereby the upper mould 74 is unconstrained against both rotational and translational lateral movement, during the press bending operation. Moreover, the support frame 80 is suspended from the cable 86 which in turn does not constrain the upper mould 74 against lateral movement during the press bending operation. In addition, the supporting of the upper mould 74 by on the one hand a plurality of chains 82 to a support frame 80 and on the other hand by a cable 86 between the support frame 80 and the pulley 88 permits unconstrained vertical movement, for example tilting, of parts the upper mould 74 during the press bending operation.

The upper mould 74 is required accurately to be positioned with respect to each of the plurality of the gravity bending moulds 10 in the entire loop including the tunnel furnace. In practice, the translational position, both horizontal and vertical, and the rotational position both horizontal and tilting, of each gravity bending mould 10 will vary from one carriage to another not only following the initial set up of the furnace but also, in particular, after operation of the furnace. This is due to thermal expansion, deformation as a result of thermal cycling, and wear of the apparatus, for example wear of the carriage wheels on the rails.

Since the upper mould 74 is permitted to nestle into the gravity bent shape of the glass sheets 4 during the press bending operation without any constraint on its lateral or tilting movement, the upper mould 74 can readily find its correct position for accurate press bending with respect to the underlying glass sheets 4 irrespective of the variation in position relative to the upper mould 74 of those glass sheets 4 from one gravity bending mould 10 to another. This provision of freedom of movement of the upper mould 74 during the press bending operation ensures that accurate press bending is achieved irrespective of any variations in positions between the plurality of lower gravity bending moulds. The suspension of the upper mould 74 by flexible members such as chains 82 permits this unconstrained movement.

In addition, the upper mould 74 is supported by the chains 82 whereby the upper mould 74 can be rolled to a minor extent slightly into contact with the underlying glass sheets 4. This provides that the required shape of the underlying glass sheets 4 can be achieved by a progressive pushing action as a result of the upper die progressively coming into contact with the underlying glass sheets 4. Preferably, the upper mould 74 is rolled onto the upper glass surface so that the deep bend portions are first shaped by the upper mould 74.

The provision of the stop members in which the lower stop member includes a hemispherical dome and the upper stop member consists of a flat plate against which the dome bears ensures reliable relative vertical positioning of the upper mould and the lower mould so as to minimize inadvertent marking of the glass sheets by the gravity bending mould 10. However this is achieved without removing or reducing the ability of the upper mould 74 to move laterally both translationally and rotationally and to tilt vertically relative to the lower mould 10 and the glass sheets 4 in an unconstrained manner during the press bending operation.

The present invention can enable glass sheets to be manufactured with bend portions having radii as little as 150 mm. This may be compared to a minimum radius of 450 mm when gravity bending is employed using differential heating of the glass sheets and a minimum radius of 1000 mm when employing gravity bending without differential heating.

The present invention enables glass sheets with deep bend portions to be manufactured having edge stresses which compare to those achievable using conventional sag bending techniques. The present invention typically enables bent glass sheets to be manufactured having edge tensile stresses of less than 7 MPa. This enables glass sheets to be bent without requiring a subsequent anneal to remove stresses, following the press bending step.

What is claimed is:

1. A method of bending glass sheets, comprising the steps of gravity bending a glass sheet at elevated temperature on a gravity bending mould in a gravity bending zone of a furnace, press bending the gravity bent glass sheet to a desired shape with an upper mould while the glass sheet is supported by the gravity bending mould as a lower mould in a press bending zone of the furnace and cooling the glass sheet in the press bending zone upon entry of the glass sheet into the press bending zone at a controlled cooling rate by controlling ambient temperature in the press bending zone.

2. A method according to claim 1 wherein the ambient temperature in the press bending zone is controlled so as to be within the range of from 500° to 600° C.

3. A method according to claim 2 wherein the ambient temperature in the press bending zone is controlled s as to be within the range of from 550° to 580° C.

4. A method according to claim 1, wherein the cooling rate of the glass sheet in the press bending zone is controlled so as to be up to 50° C. per minute.

5. A method according to claim 4 wherein the cooling rate of the glass sheet in the press bending zone is controlled so as to be up to 30° C. per minute.

6. A method according to claim 5 wherein the cooling rate of the glass sheet in the press bending zone is controlled so as to be from 10° to 20° C. per minute.

7. A method according to claim 1, wherein the press bending step is carried out for a period of up to 20 seconds.

8. A method according to claim 7 wherein the press bending step is carried out for a period of from 5 to 15 seconds.

9. A method according to claim 8 wherein the press bending step is carried out for a period of from 10 to 15 seconds.

10. A method according to claim 1, wherein the upper mould applies a pressing load to the upper surface of the glass sheet of from 50 to 150 kg.

11. A method according to claim 10 wherein the upper mould applies a pressing load to the upper surface of the glass sheet of from 50 to 100 kg.

12. A method according to claim 1, wherein during the press bending step the upper mould rests on the glass sheet with a selected net weight.

13. A method according to claim 1, wherein the upper mould is adapted to be lowered onto an upper surface of the glass sheet by a suspension system which is configured to permit lateral and tilting movement of the upper mould relative to the gravity bending mould supporting the glass sheet.

14. A method according to claim 1, wherein at the end of the press bending step the upper mould and the gravity bending mould are spaced a selected distance from each other by a plurality of spacer devices which are configured to permit lateral movement of the upper mould relative to the gravity bending mould.

15. A method according to claim 1, wherein the temperature of the portions of the glass sheet to be press bent on entry into the press bending zone from the gravity bending zone is from 625° to 640° C.

16. A method according to claim 1, wherein the gravity bending mould comprises an articulated mould having an annular rim which bears against the lower surface of the bent glass sheet, the annular rim having a thickness of from 3 to 4 mm.

17. A method of press bending glass sheets, the method comprising providing an initially bent glass sheet carried on an articulated gravity bending mould and press bending the glass sheet to a final bent shape by an upper press bending mould which is lowered onto an upper surface of the glass sheet, the upper press bending mould having a net weight of from 50 to 150 kg, the press bending of the glass sheet being performed in a press bending zone and including cooling the glass sheet at a controlled rate in the press bending zone upon entry of the glass sheet into the press bending zone by controlling the temperature in the press bending zone.

18. A method according to claim 17 wherein the press bending is carried out at an ambient temperature of from 500° to 600° C.

19. A method according to claim 18 wherein the press bending is carried out at an ambient temperature of from 550° to 580° C.

20. A method according to claim 17 wherein the press bending step is carried out for a period of from 5 to 15 seconds.

* * * * *